Patented Sept. 1, 1925.

1,551,888

UNITED STATES PATENT OFFICE.

ERNST THEODOR KREBS, OF SAN FRANCISCO, CALIFORNIA.

LEPTINOL AND PROCESS FOR MAKING THE SAME.

No Drawing. Application filed April 23, 1923. Serial No. 634,178.

*To all whom it may concern:*

Be it known that I, ERNST THEODOR KREBS, a citizen of the United States, and a resident of San Francisco, in the county of San Francisco and State of California, have invented certain new and useful Improvements in Leptinol and Processes for Making the Same, of which the following is a specification.

This invention relates to a medicinal preparation and a process for extracting the same from the roots of leptotænia dissecta.

An object of the invention is the provision of a process for removing undesirable constituents of the roots of leptotænia dissecta and modifying the extracted oils and resins to such an extent that they will be soluble in water and therefore more effective as a medicinal preparation.

A further object of the invention is the provision of a medicinal preparation made from the roots of leptotænia dissecta by the elimination of gums and other undesirable constituents and the saponification of the oils and resins contained in the roots thereby providing a more soluble and more readily assimilated preparation when taken internally.

In order to obtain the leptinol I cut the roots of leptotænia dissecta into small particles in any well known manner and place them in a drying shed, taking care that the sun-light does not fall upon the same. The chopped roots are laid out flat and the shed is well ventilated to permit the air to pass freely through the same to aid in the drying of the roots. The roots may be thoroughly dried in a dessicating machine and when thoroughly dried are ground to a coarse powder and this material is firmly packed in percolators in the same manner as is employed in the preparation of tinctures or fluid extracts. It is permitted to macerate in alcohol of high proof for one or more days and then allowed to percolate. The alcoholic extract thus obtained has approximately the strength of ordinary fluid extract, that is, one pint of the extract representing one pound of the drug.

This alcoholic solution or extract is treated with approximately 2 per cent of a saturated alcoholic solution of an alkaline hydroxide preferably potash or soda and the mixture is agitated vigorously until the reaction has been completed and the gums and other undesirable constituents have been precipitated with a consequent saponification of the oils and resins of the leptotænia. The alcoholic solution is siphoned or filtered and it is this solution which I term "leptinol" and the product is more soluble in water and is therefore more readily assimilated by the digestive system.

The product thus obtained and which I designate as leptinol is valuable for its medicinal properties, being a very powerful and effective stimulating expectorant since it directly affects the mucous secretions. The oil is antiseptic and stimulates granulations when applied to wounds or sores.

What I claim is:

1. A process for making leptinol which consists in treating the roots of leptotænia dissecta with alcohol, removing the gum from the alcoholic extract and saponifying the resins and oils of said extract.

2. A process for making leptinol which consists in treating the roots of leptotænia dissecta with alcohol, to form an alcoholic extract of the same, treating such alcoholic extract with an alkaline hydroxide to precipitate gums and other undesirable elements, and simultaneously saponify oils and resins.

3. A process for making leptinol which consists in treating the roots of leptotænia dissecta with alcohol of high proof to form an alcoholic extract, treating such extract with a saturated alcoholic solution of an alkaline hydroxide and then vigorously agitating the mixture.

4. A process for making leptinol which consists in treating the roots of leptotænia dissecta with alcohol to form an alcoholic extract, treating the alcoholic extract with 2 per cent of an alcoholic saturated solution of an alkaline hydroxide.

5. A process for the manufacture of leptinol which consists in drying the roots of leptotænia dissecta, grinding the dried roots into a fine powder, causing alcohol to percolate through the powder to form an alcoholic extract, treating such extract with an alcoholic solution of an alkaline hydroxide, shaking the same vigorously, and then separating the solution from the precipitate.

6. A medicinal compound comprising an alcoholic extract of leptotænia dissecta from which the gums and other undesirable elements have been removed and in which the oils and resins have been saponified.

ERNST THEODOR KREBS.